(12) United States Patent
Gold et al.

(10) Patent No.: US 12,373,349 B2
(45) Date of Patent: Jul. 29, 2025

(54) CMB CACHING USING HYBRID SRAM/DRAM DATA PATH

(71) Applicant: Western Digital Technologies, Inc., San Jose, CA (US)

(72) Inventors: Stephen Gold, Fort Collins, CO (US); Judah Gamliel Hahn, Ofra (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/359,159

(22) Filed: Jul. 26, 2023

(65) Prior Publication Data
US 2024/0354256 A1 Oct. 24, 2024

Related U.S. Application Data

(60) Provisional application No. 63/497,784, filed on Apr. 24, 2023.

(51) Int. Cl.
*G06F 12/0875* (2016.01)
*G06F 12/0804* (2016.01)

(52) U.S. Cl.
CPC ...... *G06F 12/0875* (2013.01); *G06F 12/0804* (2013.01); *G06F 2212/1016* (2013.01); *G06F 2212/221* (2013.01)

(58) Field of Classification Search
CPC .............. G06F 12/0875; G06F 12/0804; G06F 2212/1016; G06F 2212/221
See application file for complete search history.

(56) References Cited

U.S. PATENT DOCUMENTS

| | | | |
|---|---|---|---|
| 10,275,378 | B2 | 4/2019 | Benisty |
| 10,372,378 | B1 | 8/2019 | Benisty et al. |
| 10,564,872 | B2 | 2/2020 | Benisty |
| 11,042,302 | B2 | 6/2021 | Benisty |
| 11,061,607 | B2 * | 7/2021 | Koo ................. G06F 21/78 |
| 11,392,509 | B2 | 7/2022 | Xu et al. |
| 11,409,466 | B2 | 8/2022 | Benisty |
| 11,604,735 | B1 | 3/2023 | Segev et al. |
| 2008/0140893 | A1 | 6/2008 | Barrett et al. |
| 2010/0185806 | A1 | 7/2010 | Pruthi et al. |

(Continued)

FOREIGN PATENT DOCUMENTS

KR 20210029833 A 3/2021

*Primary Examiner* — Prasith Thammavong
(74) *Attorney, Agent, or Firm* — PATTERSON + SHERIDAN, LLP

(57) ABSTRACT

A Controller Memory Buffer (CMB) caching mechanism can be used for increased CMB performance. Rather than reading data and writing data from the static random access memory (SRAM), data is read from the SRAM. When data is read from the CMB in SRAM there is increase performance, but little space to process both read and write commands. Using a dynamic random access memory (DRAM) for write commands and CMB in SRAM for read commands allows for increased performance. Due to limited space in the SRAM, when the read commands are read from the host, the commands are deleted. This allows for relevant data stored in the SRAM to be used for the next command, but then deleted for the next command to be processed. The increase in performance is allowed, while not using extra SRAM or DRAM.

7 Claims, 12 Drawing Sheets

(56) References Cited

U.S. PATENT DOCUMENTS

| | | |
|---|---|---|
| 2010/0287327 A1 | 11/2010 | Li et al. |
| 2012/0297118 A1* | 11/2012 | Gorobets .............. G06F 3/0679 |
| | | 711/E12.008 |
| 2018/0107408 A1* | 4/2018 | Sterns ................... G06F 3/0665 |
| 2021/0096985 A1* | 4/2021 | Kim ....................... G06F 3/0652 |
| 2021/0103445 A1 | 4/2021 | Schauer et al. |
| 2021/0334217 A1* | 10/2021 | Sharma ............... G06F 12/0246 |
| 2022/0004493 A1* | 1/2022 | Colella ............... G06F 12/0246 |
| 2022/0187992 A1 | 6/2022 | Malakapalli et al. |
| 2022/0334765 A1 | 10/2022 | Jung et al. |

\* cited by examiner

CMB CACHING USING HYBRID SRAM/DRAM DATA PATH

CROSS-REFERENCE TO RELATED APPLICATIONS

This application claims benefit of U.S. provisional patent application Ser. No. 63/497,784, filed Apr. 24, 2023, which is herein incorporated by reference.

BACKGROUND OF THE DISCLOSURE

Field of the Disclosure

Embodiments of the present disclosure generally relate to a Controller Memory Buffer (CMB) caching for increased CMB performance.

Description of the Related Art

Non-volatile memory Express (NVMe) is based on a paired submission and completion queue mechanism. Commands are placed by host software into a submission queue. Completions are placed into the associated completion queue by a controller. In general, submission and completion queues are allocated in a host memory while each queue might be physically located contiguously or non-contiguously in the host memory. However, the CMB features enables the host to place submission queues, completion queues, Physical Region Page (PRP) lists, Scatter Gather List (SGL) segments, and data buffers in the controller memory.

The Persistent Memory Region (PMR) is an optional region of general purpose read/write persistent memory that may be used for a variety of purposes. The address range of the PMR is defined by a peripheral component interconnect (PCI) Base Address register (BAR) and consumes the entire address region exposed by the BAR. The PMR supports the required features of the PCI express (PCIe) programming model (i.e., PMR in no way restricts what is otherwise permitted by PCI Express). The contents of the PMR persists across PMR disables, controller, and NVM subsystem resets and power cycles.

There are several different types of read/write accesses that can occur with CMB. Sector data reads or writes, with a dedicated address range within the CMB address space. An NVMe submission/completion queue reads or writes, with a dedicated address range within the CMB address space. Furthermore, an NVMe PRP list or SGL segment reads or writes, with a dedicated address range within the CMB address space.

The CMB performance varies depending on whether the performance is using static random access memory (SRAM) in the controller or dynamic random access memory (DRAM) attached to the controller to store the CMB accesses. The normal data path is through SRAM (for the best performance and power) and so the DRAM is designed for metadata storage rather than as a part of the data path. This means the DRAM interface on the controllers is small (e.g. 32-bit bus width) and the DRAM is being used for millions of small metadata random reads and writes (which reduces the DRAM efficiency significantly). Adding CMB data traffic into this metadata-optimized DRAM path will limit the host performance to a much lower level.

In the previous approach a CMB can be incorporated in either DRAM or SRAM, but without cache management. Though, the main drawback would be measured in CMB performance and latency. Using cache algorithms are the traditional cache mechanisms (e.g. least recently used (LRU)) which is not adapted to CMB resulting in low hit-rate. Dedicating a very large amount of SRAM in the SSD of controller adds a lot of costs. While using a wider DRAM interface (e.g. 64 bit bus width) to provide more DRAM raw bandwidth efficiency will be reduced significantly. Having a wider DRAM bus adds controller cost and increases the DRAM costs on smaller drives. Using two separate DRAM interfaces, one for metadata and another for data path including CMB also adds a lot of controller costs.

Therefore, there is a need in the art for a CMB caching mechanism for increased CMB performance.

SUMMARY OF THE DISCLOSURE

A Controller Memory Buffer (CMB) caching mechanism can be used for increased CMB performance. Rather than reading data and writing data from the static random access memory (SRAM), data is read from the SRAM. When data is read from the CMB in SRAM there is increase performance, but little space to process both read and write commands. Using a dynamic random access memory (DRAM) for write commands and CMB in SRAM for read commands allows for increased performance. Due to limited space in the SRAM, when the read commands are read from the host, the commands are deleted. This allows for relevant data stored in the SRAM to be used for the next command, but then deleted for the next command to be processed. The increase in performance is allowed, while not using extra SRAM or DRAM.

In one embodiment, a data storage device comprises: a memory device; and a controller coupled to the memory device, wherein the controller has a controller memory buffer (CMB) and the controller is configured to: receive a read command from a host device; retrieve data from the memory device, wherein the data is associated with the read command; write the retrieved data to a CMB cache of the CMB; inform the host device the read command is completed; and delete the retrieved data from CMB cache after the host device has read the retrieved data from the CMB cache.

In another embodiment, a data storage device comprises: a memory device; and a controller coupled to the memory device, wherein the controller is configured to: receive a read command from a host device; read data from the memory device, wherein the read data corresponds to the read command; place the read data in controller memory buffer (CMB) cache; determine that the host device has read the read data from CMB cache; find relevant physical region page (PRP) pointer or scatter gather list (SGL) pointer in mapping table; delete the read data from the CMB cache; and delete the PRP pointer or SGL pointer from the mapping table.

In another embodiment, a data storage device comprises: means to store data; and a controller coupled to the means to store data, wherein the controller is configured to: retrieve data from the means to store data; write the retrieved data in static random access memory (SRAM); detect that the retrieved data has been received by a host device; and delete the retrieved data from SRAM based upon the detecting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A Controller Memory Buffer (CMB) caching mechanism can be used for increased CMB performance. Rather than reading data and writing data from the static random access memory (SRAM), data is read from the SRAM. When data is read from the CMB in SRAM there is increase performance, but little space to process both read and write commands. Using a dynamic random access memory (DRAM) for write commands and CMB in SRAM for read commands allows for increased performance. Due to limited space in the SRAM, when the read commands are read from the host, the commands are deleted. This allows for relevant data stored in the SRAM to be used for the next command, but then deleted for the next command to be processed. The increase in performance is allowed, while not using extra SRAM or DRAM.

Figure 1:
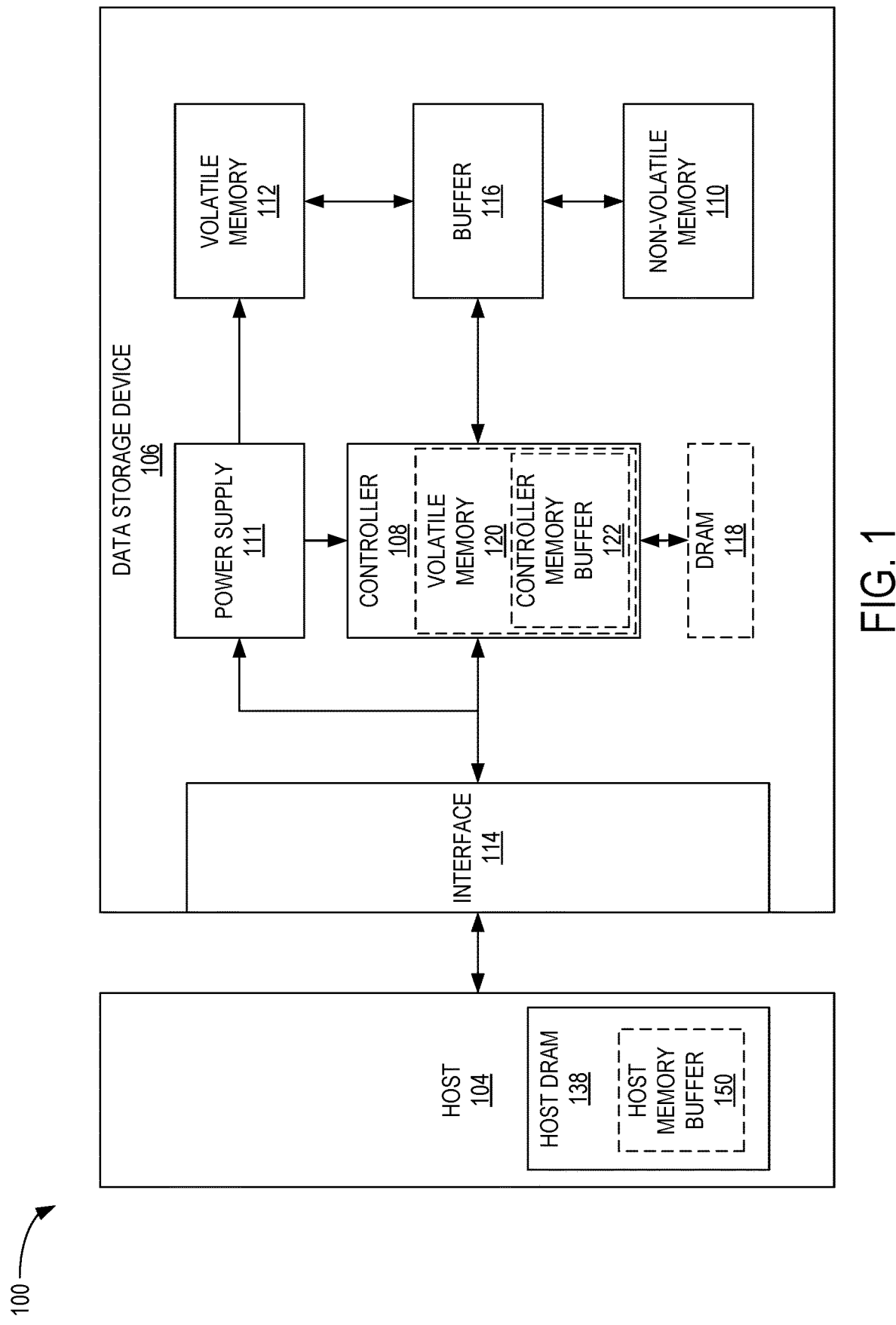
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
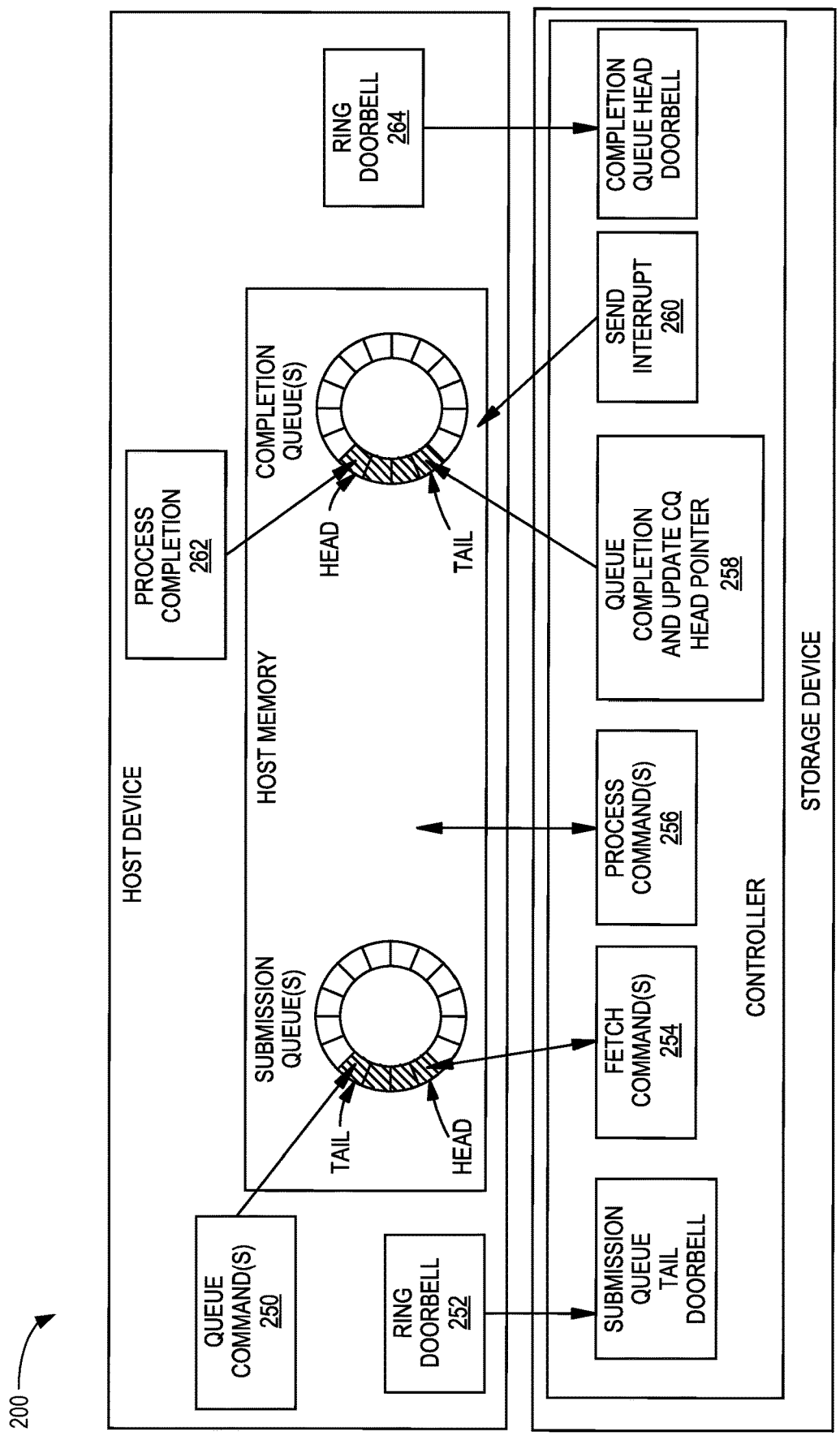
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a SQ as an entry. The host device may write one or more commands into the SQ at operation 250. The commands may be read commands or write commands. The host device may comprise one or more SQs.

In operation 252, the host device writes one or more updated SQ tail pointers and rings a doorbell or sends an interrupt signal to notify or signal the storage device of the new command that is ready to be executed. The host may write an updated SQ tail pointer and send a doorbell or interrupt signal for each of the SQs if there are more than one SQs. In operation 254, in response to receiving the doorbell or interrupt signal, a controller of the storage device fetches the command from the one or more SQs, and the controller receives the command.

In operation 256, the controller processes the command and writes or transfers data associated with the command to the host device memory. The controller may process more than one command at a time. The controller may process one or more commands in the submission order or in the sequential order.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the CQ is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
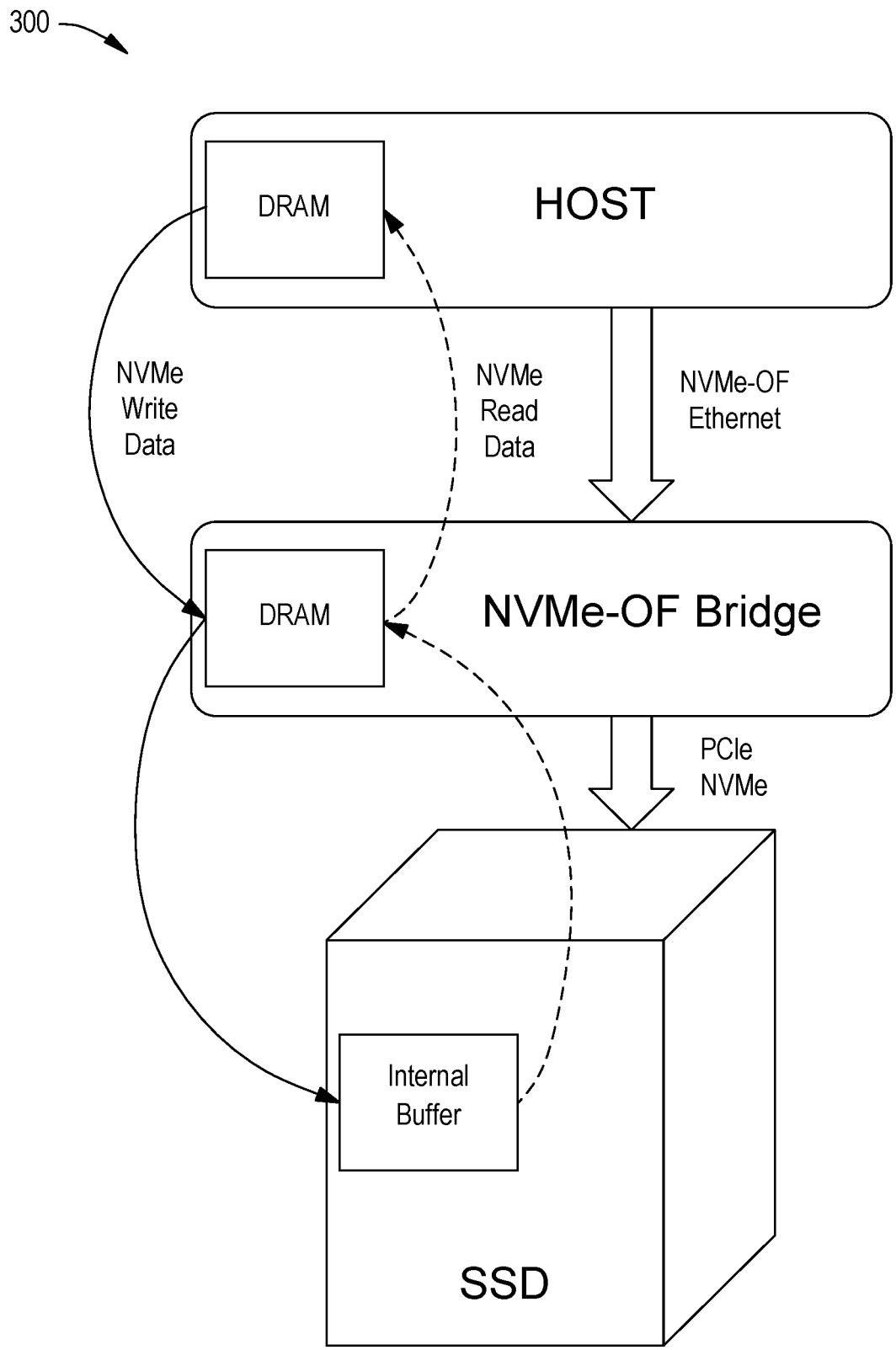
FIG. 3A is a block diagram illustrating a method of processing data through a data path without a CMB, according to an exemplary embodiment.

FIG. 3A is a block diagram illustrating a method 300 of processing data through a data path without a CMB, according to an exemplary embodiment. The primary use is for a drive behind a bridge (e.g. NVMe-OF bridge, Analytics Engine), where the SSD is connected to the backend of the bridge (i.e. the drive does not connect directly to a host).

Without CMB in the SSD drives, all the host data, such as host 104 of FIG. 1, has to be staged in the bridge DRAM first and then sent to the SSD, resulting in all host data going into and out of the bridge DRAM. The bridge DRAM has a large bandwidth and is not scalable. When there are a lot of SSDs connected to the bridge, all of the host traffic goes through the bridge DRAM. All of the processing that the NVMe does is based on memory addresses. When the host wants to write data or read data, the host will communicate with the bridge. To read data, the host will send an NVMe command over the NVMe Ethernet requesting a piece of data at an address in the SSD. The DRAM will then continue with the command over the PCIe NVMe interface for the address in the SSD to be read by the host. To write data, the host will send an NVMe command over the NVMe Ethernet requesting a piece data in the host DRAM. The bridge will then store the data from the host DRAM. The data will continue from the bridge DRAM over the PCIe NVMe interface to be written to the SSD. When a lot of SSDs are placed behind the bridge, the bridge suffers from a bottle neck performance.

Figure 3B:
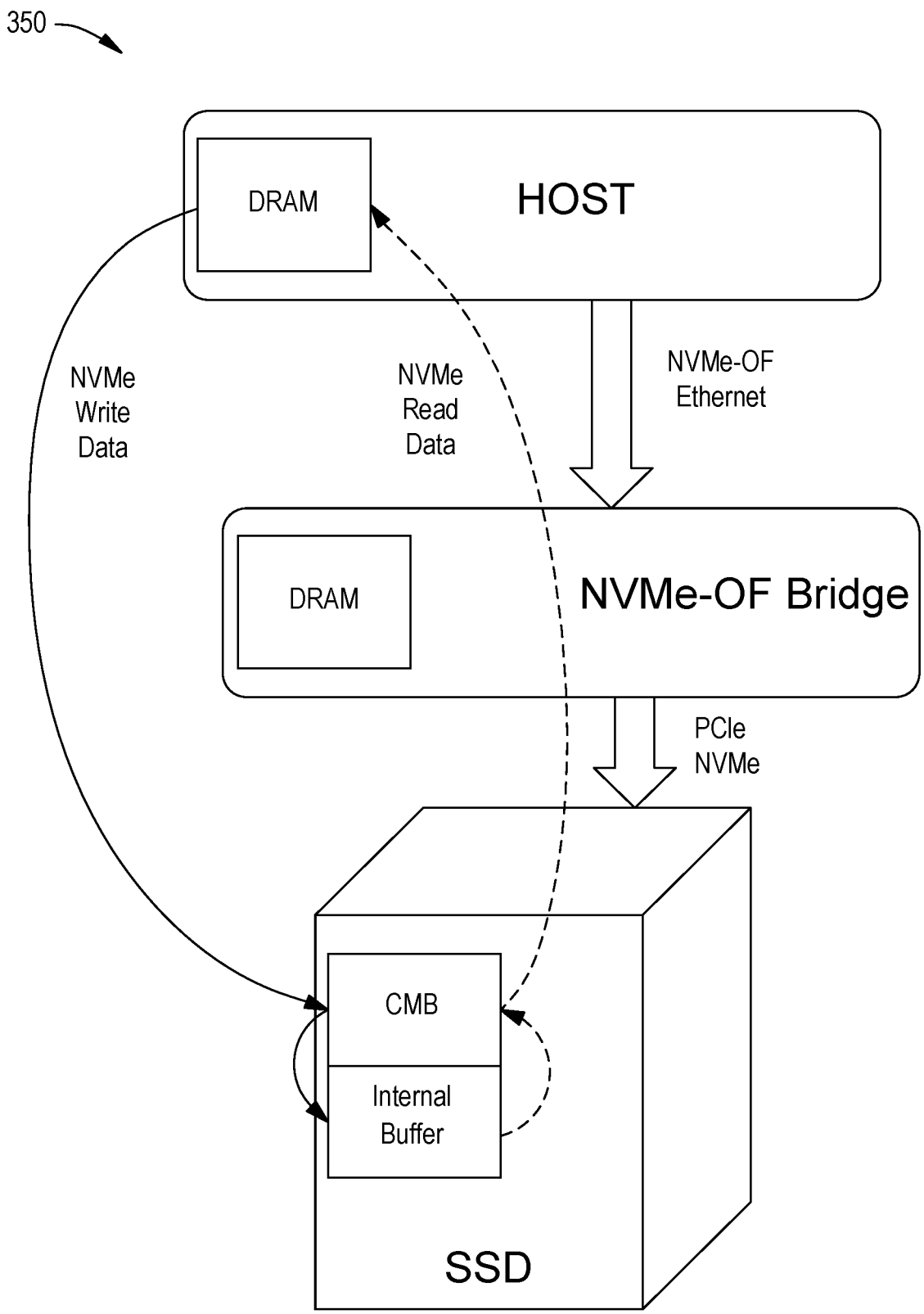
FIG. 3B is a block diagram illustrating a method of processing data through a data path with a CMB, according to an exemplary embodiment.

To avoid the bottle neck performance issues, some or all of the host data bypasses the bridge DRAM and go directly to a CMB in an SSD. FIG. 3B is a block diagram illustrating a method 350 of processing data through a data path with a CMB, according to an exemplary embodiment. For example, the CMB can be used to store host data (instead of storing host data in the bridge DRAM). By adding a piece of memory on the SSD the bottleneck performance issue of using the bridge DRAM for read and write commands is avoided.

When the host requests to write a piece of data in the host DRAM, the data will be read from the NAND. Once the data is read from the NAND, the data is put in the CMB in the SDD. The data will then be passed to the bridge DRAM via the PCIe NVME interface. The bridge DRAM will not store the data, but pass the data on to the host DRAM via the NVMe Ethernet. The bridge DRAM is bypassed, because the SSD creates a piece of memory to use as a memory buffer for reading and writing to the host.

Figure 4A:
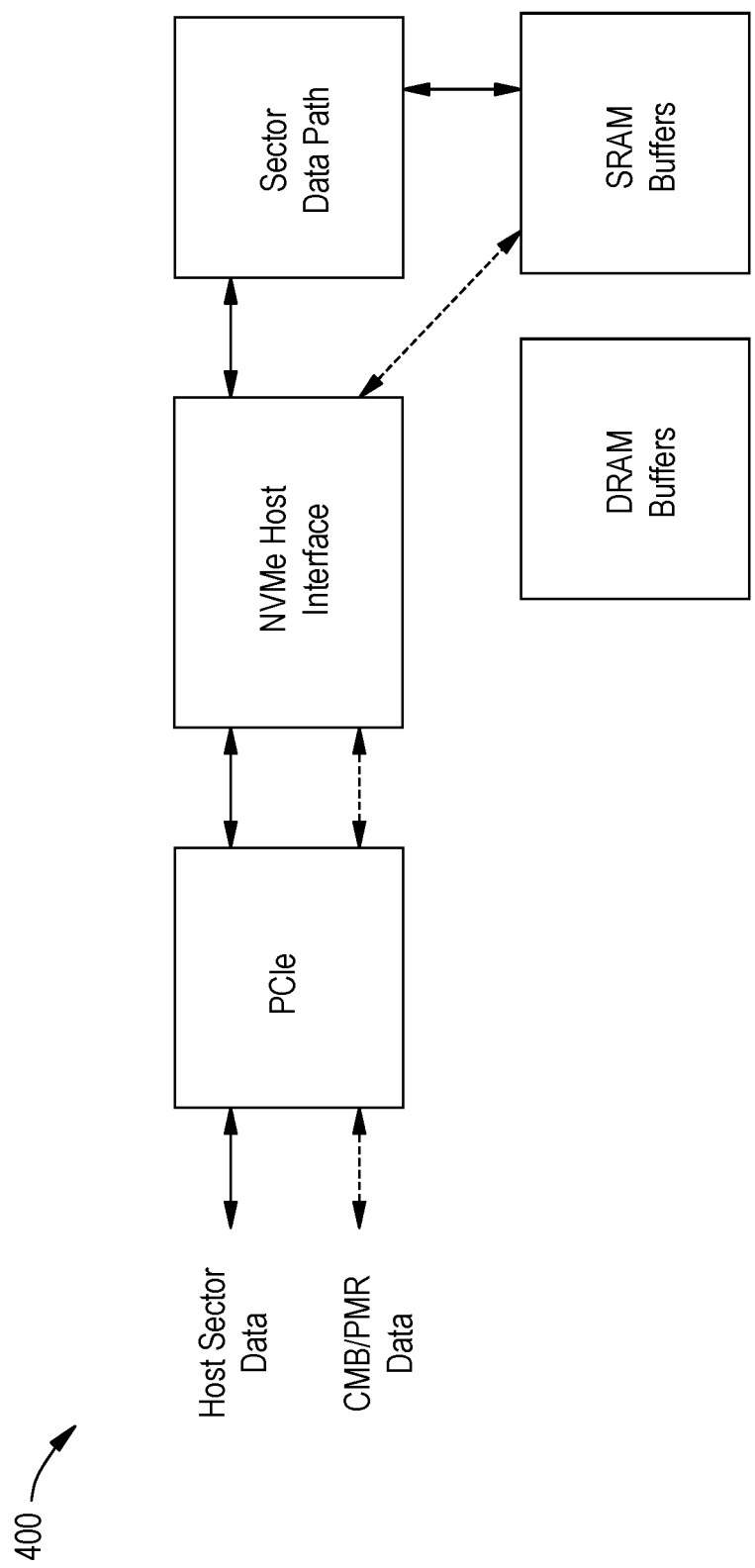
FIG. 4A is a block diagram illustrating a method of processing data with a CMB/PMR in the SRAM, according to an exemplary embodiment.

The CMB/PMR size is a critical factor in terms of where the CMB/PMR data can be stored in the SSD. FIG. 4A is a block diagram illustrating a method 400 of processing data with a CMB/PMR in the SRAM, according to an exemplary embodiment. There is minimal internal contention since the SRAM bandwidth is designed around PCIe bandwidth. Therefore, CMB/PMR at line-rate is possible. If the size is small enough, the CMB/PMR can be stored in spare SRAM (e.g. SRAM that would be used for other advanced features that are disabled). The small buffer size allows a PMR SRAM buffer to be protected during performance fail (pFail). Though with the small SRAM size there is not much SRAM to spare.

Figure 4B:
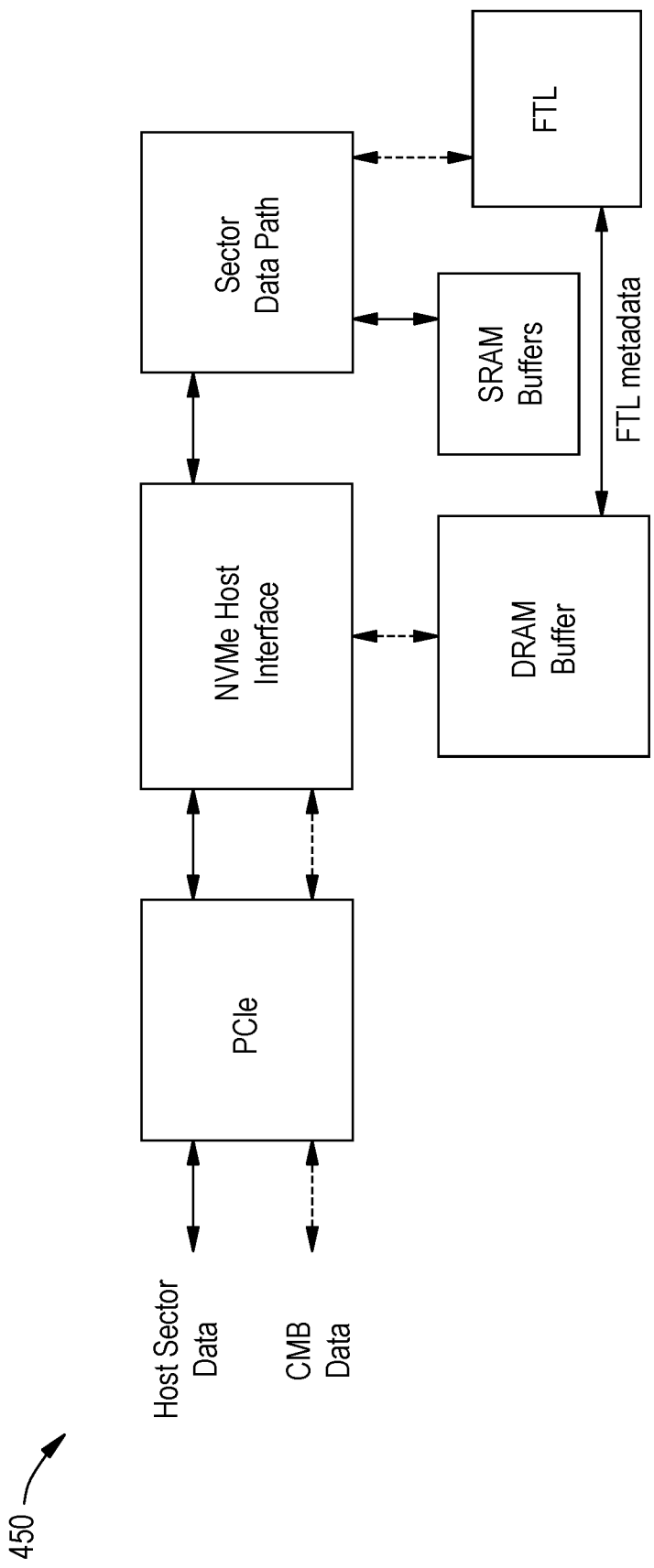
FIG. 4B is a block diagram illustrating a method of processing data with a CMB in the DRAM, according to an exemplary embodiment.

If the CMB size is larger than max CMB SRAM size, the CMB is held in DRAM. FIG. 4B is a block diagram illustrating a method 450 of processing data with a CMB in the DRAM, according to an exemplary embodiment. There is significant internal contention since DRAM bandwidth would be used by both CMB data and FTL metadata (e.g. L2P table). Even with 100% CMB traffic (no sector data traffic), the DRAM bandwidth is unlikely to allow line-rate performance. With mixed CMB and sector data traffic, either CMB performance or sector data performance will be reduced. Particularly during write workloads, which have the highest meta data traffic (random small read/writes) to the DRAM. Therefore, using the CMB in the DRAM will significantly take away from the speed opposed to the speed found in placing the CMB in the SRAM.

Figure 5:
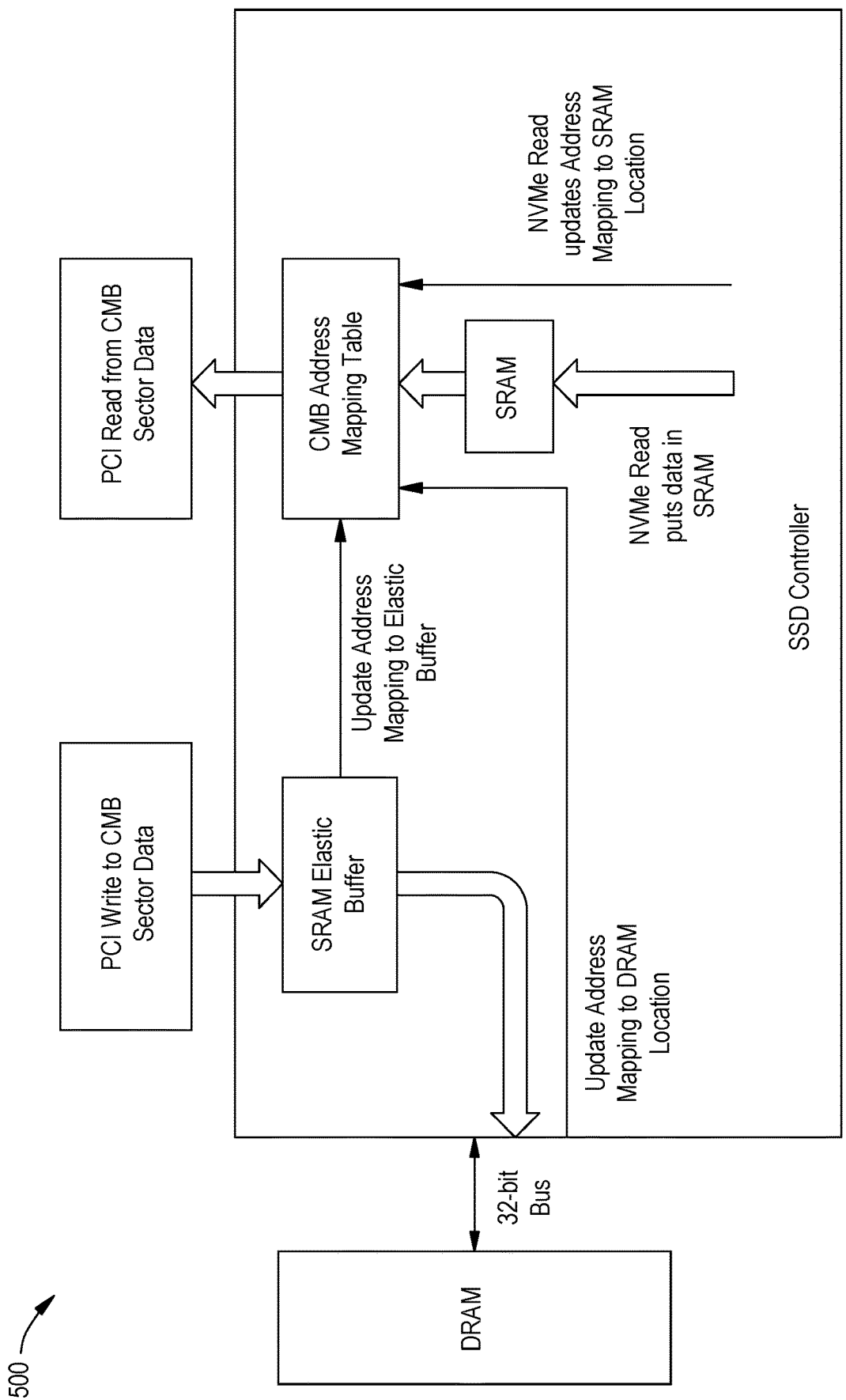
FIG. 5 is a block diagram illustrating a method of a CMB using asymmetrical performance, according to an exemplary embodiment.

To avoid losing space with a CMB in the SRAM and losing speed with a CMB in a DRAM, asymmetrical performance is suggested. FIG. 5 is a block diagram illustrating a method 500 of a CMB using asymmetrical performance, according to an exemplary embodiment. Asymmetrical performance requires the CMB host reads to go through the SRAM (full bandwidth) while the CMB host writes go through the DRAM (reduce bandwidth). Asymmetrical performance also requires the controller such as controller 108 of FIG. 1 to maintain a CMB address mapping table from the CMB address space into DRAM and SRAM addresses. The CMB address mapping table is similar to a flash logical to physical mapping table. Maintaining a CMB address mapping table enables a CMB PCIe read from the CMB sector data in the SRAM. Once the SRAM is read, the data in the SRAM is then deleted allowing for more subsequent read commands to be stored in the SRAM for processing.

To enable base support for just CMB sector data/metadata (no CMB queues or PRP/SGL lists), the CMB address mapping table would need to implement a hybrid mode. In hybrid mode, the PCIe writes to CMB (sector data/metadata) could initially be placed in the SRAM elastic buffer, and while in the SRAM elastic buffer the CMB address mapping would reflect that SRAM location. Though, when the PCIe writes are moved from elastic buffer to DRAM, the CMB address mapping would need to be updated to point to the DRAM location. Alternatively, if the elastic buffer is not required, then the writes to CMB (sector data/metadata) would be written directly to a DRAM location and the CMB address mapping would point to the DRAM location. PCIe reads from CMB (sector data/metadata) would always lookup the CMB address mapping table to know where to obtain the requested data. When an NVMe read command has the CMB as the destination address, the data read from NAND would be placed in SRAM. The CMB address mapping for the destination address would be updated to point to data in SRAM. Once data is read from the SRAM, the data is then deleted as opposed to reading data in the SRAM and sending the read data to the DRAM. The data is deleted, and the DRAM is used strictly for write commands. Thus, a CMB read of the results of an NVMe read command would produce maximum performance (e.g. line rate). Alternatively, if the host writes sector data into CMB and then directly reads that sector data back out again (using CMB as a scratch pad) then if the write data has been moved into DRAM the read back of that data will be at a reduced DRAM performance.

CMB/PMR may hold the following structures. CMB/PMR becomes a hot topic in the enterprise market for the next generation since the feature has a direct impact on performance, especially in a PCIe fabric topology. In addition, CMB/PMR reduces the amount of storage that is implemented in the host DRAM. The admin or I/O queues may be placed in the CMB, and for a particular queue all memory associated with the queue shall reside in either the CMB or host memory.

The controller may support physical region pages (PRPs) and scatter gather lists (SGLs) in the CMB. For a particular PRP list or SGL associated with a single command, all memory associated with the PRP list or SGLs shall reside in either the CMB or host memory. The PRPs and SGLs for a command may only be placed in the CMB if the associated command is presented in a submission queue in the CMB.

The controller may support data and metadata in the CMB. All data or metadata associated with a particular command shall be located in either the CMB or host memory.

The system discussed herein incorporates CMB in DRAM while having CMB cache in SRAM to increase the performance and decrease host latency.

Figure 6:
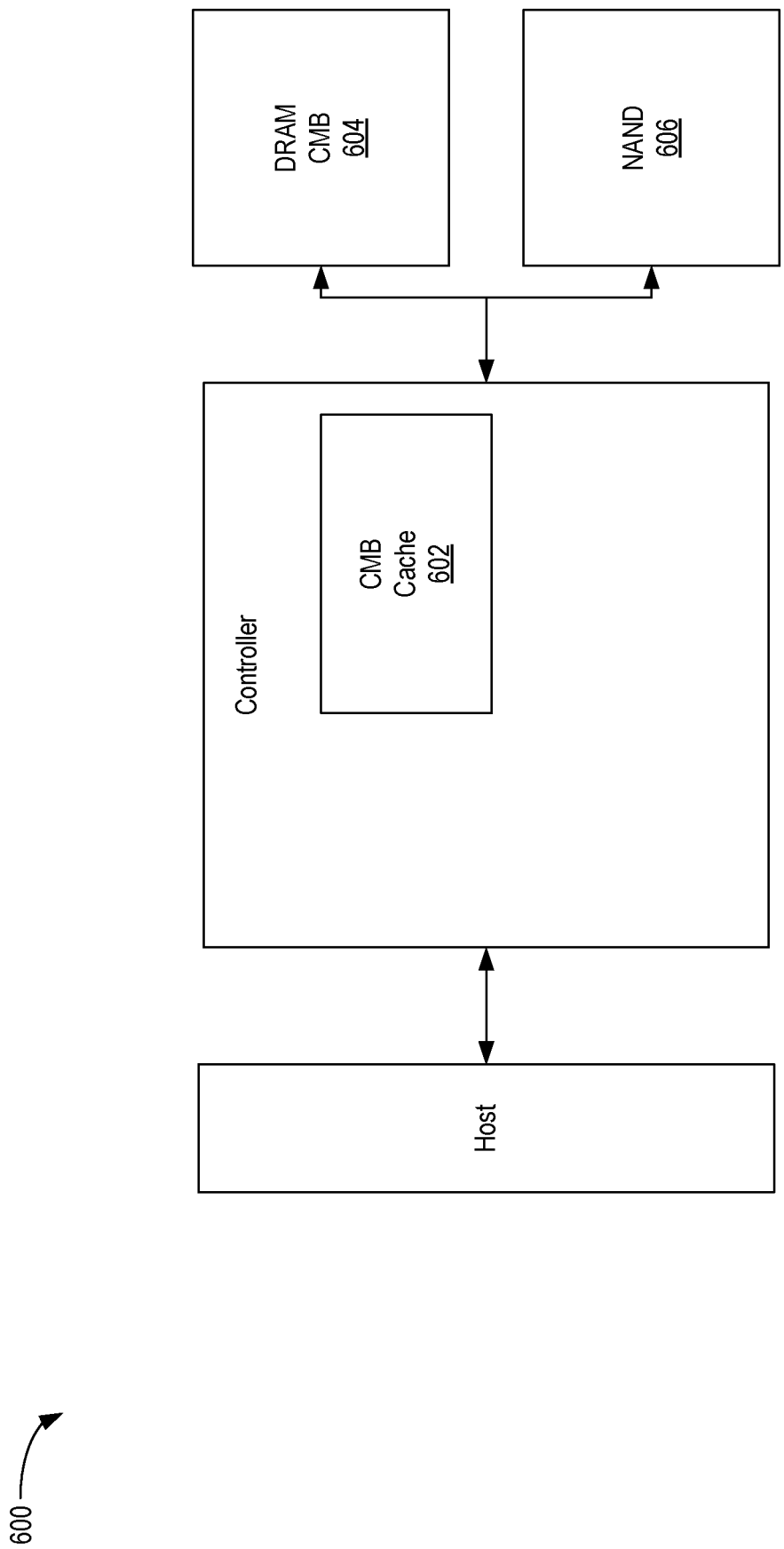
FIG. 6 is a schematic block diagram illustrating a storage system in which CMB resides in a DRAM while a CMB cache resides in a SRAM, according to certain embodiments.

To avoid reduce DRAM performance, a CMB is stored in the DRAM and the controller. FIG. 6 is a schematic block diagram illustrating a storage system 600 in which a CMB resides in a DRAM while a CMB cache resides in a SRAM, according to certain embodiments. In order for the system to be practical, there should be a strong and unique cache algorithm adapted to CMB. Otherwise, the cache buffer will not help. As discussed herein, a unique, smart caching algorithm is adapted to CMB accesses focusing on the data buffers which is more relevant to the compute segment. Previously, it was possible to have the CMB incorporated in DRAM while having a cache buffer in SRAM for user data, but the cache algorithms are the traditional mechanism that are not adapted to CMB resulting in low hit-rate.

The storage system 600 comprises a host such as host 104 of FIG. 1, a controller such as controller 108 of FIG. 1, a DRAM CMB 604, and a NAND 606. The controller further comprises a CMB cache 602. The DRAM CMB 604 is a DRAM comprising a CMB. As discussed herein, the CMB caching mechanism is adapted to CMB which shows very high hit-rates. Using the proposed approach, it would be practical to have CMB cache which was not implemented today. High-rate CMB caching mechanisms increase the overall system performance and quality of service (QOS) and allows having a practical solution for CMB.

Figure 7:
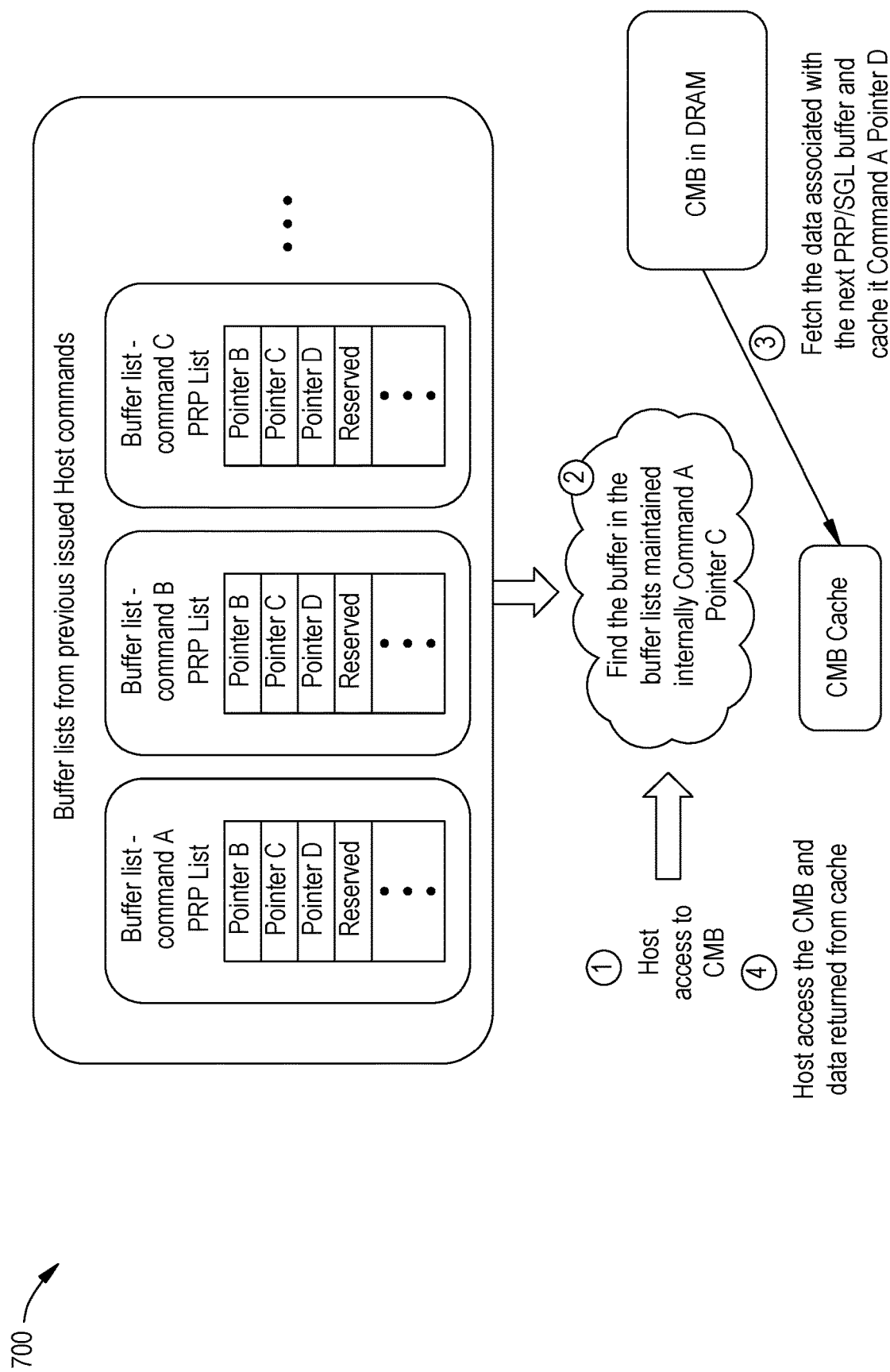
FIG. 7 is a schematic block diagram illustrating a method of a CMB caching mechanism, according to certain embodiments.

FIG. 7 is a schematic block diagram illustrating a method 700 of a CMB caching mechanism, according to certain embodiments. The basic assumption of the CMB caching mechanism is that, per command, the host such as host 104 of FIG. 1 fetches the data from a CMB in order.

In previous approaches, when completing a command, the relevant PRP/SGL pointers are deleted as they are not needed anymore. The current approach proposes maintaining the pointers until the host reads the data from the CMB. The controller such at the controller 108 of FIG. 1 uses those pointers for managing the CMB cache such as CMB cache 602 of FIG. 6, resulting in a very high hit-rate. After the host reads the data from the CMB in the SRAM, the data can be deleted. Opposed to after reading the data sending the data to the DRAM, the relevant PRP/SGL pointers are deleted. The deletion of the pointers will allow for subsequent read commands to in the CMB cache which leads to said high hit-rate.

The device controller maintains the previously issued PRP/SGL pointers in an internal database. When the host accesses the CMB to retrieve the data, the device finds the relevant pointer in the internal database. Then, the next pointer associated with the same previously issued host command is used for populating a new entry to the cache. Populating the new entry is under the assumption that the next CMB access associated with the command would be the next pointer. The relevant PRP/SGL is evicted from the internal database. Later, the host issues the next CMB access associated with the command while the data is held in the CMB cache. Again, the next PRP/SGL pointer is used for populating the next entry to the cache.

Figure 8:
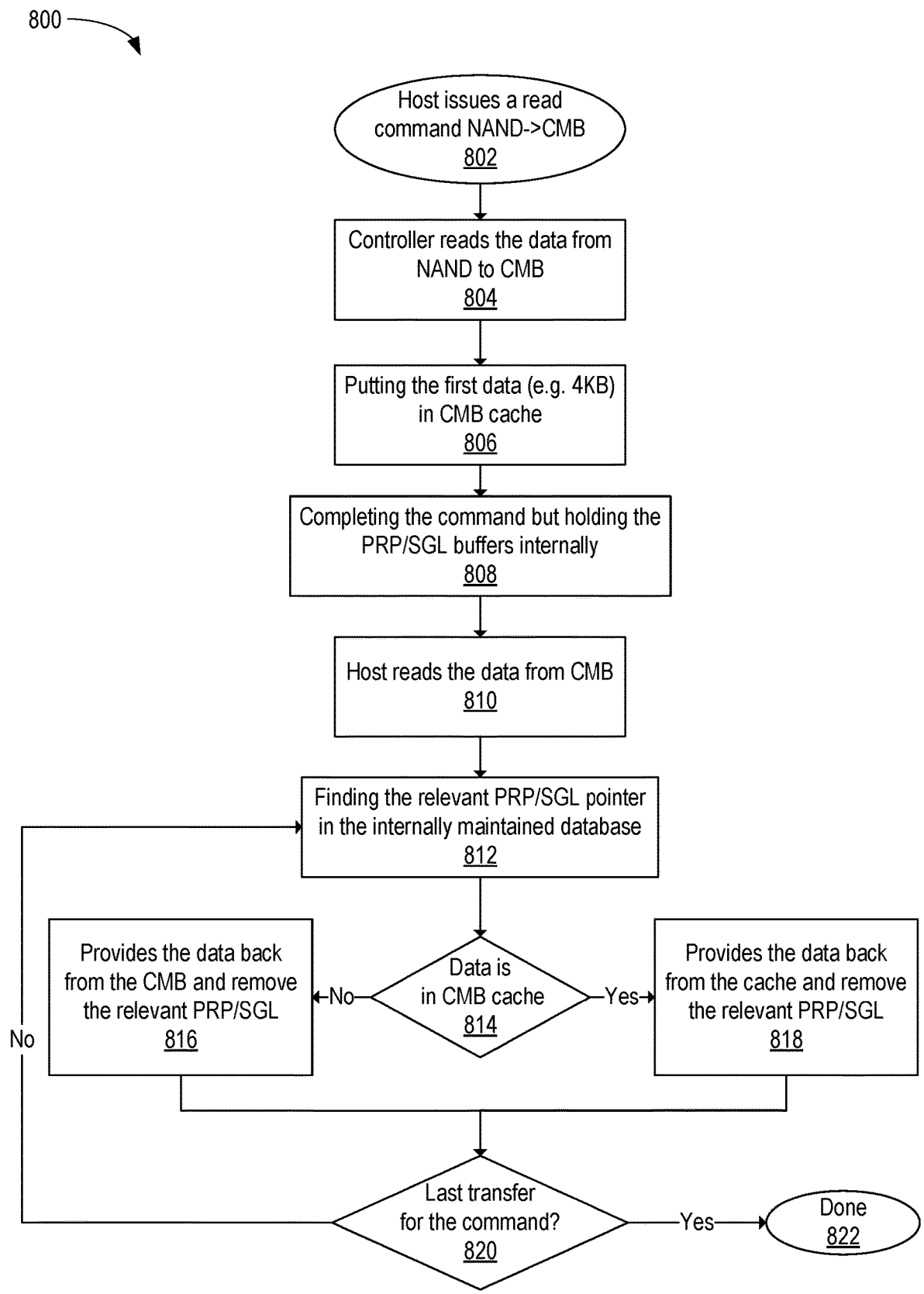
FIG. 8 is a flow chart illustrating a method for a CMB caching mechanism, according to certain embodiments.

FIG. 8 is a flow chart illustrating a method 800 for a CMB caching mechanism, according to certain embodiments. The host, at 802, such as host 104 from FIG. 1 issues a read command requesting to fetch data from NAND such as NAND 606 of FIG. 6 to CMB cache such as CMB cache 602. The device fetches the data from the NAND at 804 and puts the data in the CMB while a first chunk of data is put in the CMB cache 602 at 806. The controller such as controller 108 of FIG. 1 completes the command but the controller holds the PRP/SGL pointers internally at 808. The host then starts reading the data from the CMB cache 602 at 810. The controller then finds the relevant PRP/SGL pointer in the internal database at 812. The next PRP/SGL pointer (if any) is used for putting new data in the CMB. Finally the data is returned to the host from CMB cache.

More specifically, the method 800 begins at block 802. At block 802, the host issues a read command from the NAND to the CMB. At block 804, the controller reads the data from NAND to CMB. At block 806, the controller puts the first data (e.g. 4 KB) in the CMB cache. At block 808, the controller completes the command buts holds the PRP/SGL buffers internally. At block 810, the host reads the data from the CMB. At block 812, the controller finds the relevant PRP/SGL pointer in the internally maintained database. At block 814, the controller determines whether the data is in the CMB cache. If the controller determines that the data is not in the CMB cache then the method 800 proceeds to block 816. If the controller determines that the data is in the CMB cache then the method 800 proceeds to block 818. At both, block 816 and block 818 the controller provides the data back from the CMB or cache and removes the relevant PRP/SGL. The removal relevant PRP/SGL is not limited to after the host reads the command. The removal may be done during the read of a command by the host or after all the read command has been completely read by the host. The removal of the data is not limited to the competition of the read command. Furthermore, at the competition of both block 816 and block 818 the method 800 continues to block 820. At block 820, the controller determines whether the transfer is the last transfer for the command. If the controller determines that the transfer is not the last transfer for the command, then the method 800 returns to block 812. If the controller determines that the transfer is the last transfer for the command, then the method 800 proceeds to block 822 to end the method 800.

Figure 9:
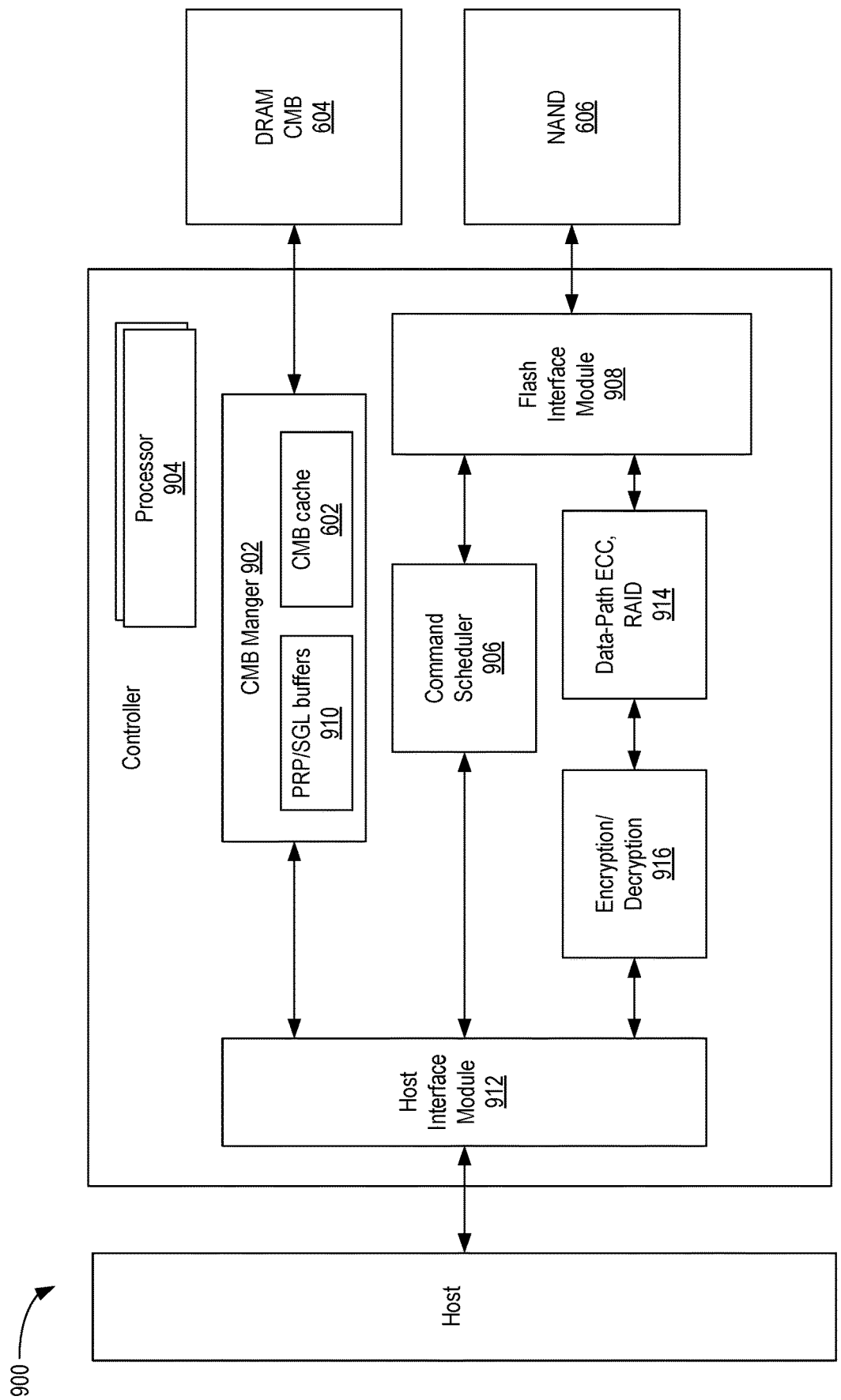
FIG. 9 is a schematic block diagram illustrating a storage system in which cache algorithm based on PRP/SGLs, according to certain embodiments.

FIG. 9 is a schematic block diagram illustrating a storage system 900 in which cache algorithm based on PRP/SGLs, according to certain embodiments. The controller such as the controller 108 of FIG. 1 incorporates the CMB cache 602 while the cache algorithm is based on the previous PRPs/SGLs provided by the host such as host 104 of FIG. 1 for the relevant old host commands. The PRP/SGL buffers are maintained in a dedicated buffer even after completing the command until the host will fetches the entire data from the CMB.

The storage system 900 comprise a host, a controller, a DRAM CMB 604, and a NAND 606. The controller includes one or more processors 904, a flash interface module (FIM) 908 for interfacing with a memory device, a host interface module (HIM) 912 for interfacing with the host, a command scheduler 906 coupled between the FIM 908 and HIM 912, an encryption/decryption modules 916 disposed between the FIM 908 and HIM 912, and a data path, ECC, and RAID 914 disposed between the encryption/decryption module 916 and FIM 908. The HIM 912 decides when to execute the write command. The FIM 908 brings data from the NAND 606. The controller also includes a CMB manager 902 that holds the PRP/SGL buffers 910 and the CMB cache 602.

Figure 10:
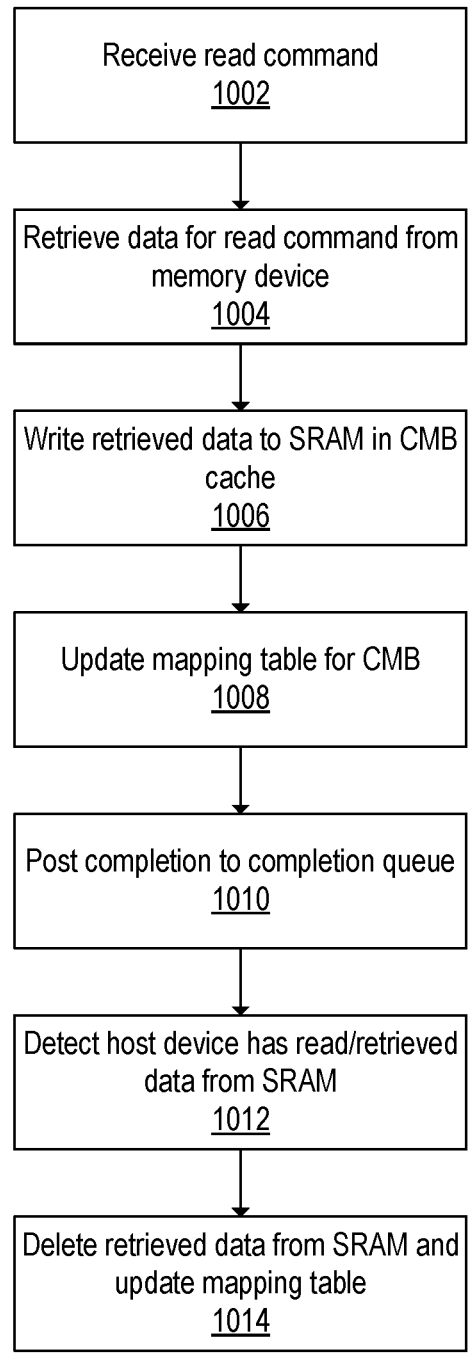
FIG. 10 is a flow chart illustrating a method for a read/write process with a CMB in SRAM, according to certain embodiments.

FIG. 10 is a flow chart illustrating a method 1000 for a read/write process with a CMB in SRAM, according to certain embodiments. The method 1000 begins at block 1002. At block 1002 the controller such as controller 108 of FIG. 1 receives a read command. At block 1004, the controller retrieves data for the read command from a memory device. At block 1006, the controller writes the retrieved data to SRAM in the CMB cache such as CMB cache 602 of FIG. 6. The controller may optionally detect an additional read command from the NAND before block 1006 is completed. At block 1008, the controller updates the mapping table for the CMB. At block 1010, the controller posts completion to the completion queue such as the completion queue of FIG. 2. At block 1012, the controller detects that the host device has read/retrieved data from the SRAM. At block 1014, the controller deletes the retrieved data from the SRAM and updates the mapping table.

The disclosure assumes that, per command, the host reads the CMD data in order, which is a valid assumption and more hosts behave in such a manner. In one embodiment, the device controller may detect that the specific host uses a different approach for the fetching order. In such a scenario, the cache management will adapt to the host behavior and cache buffers will be populated accordingly.

The overall performance is increased, and the latency is decreased since the SRAM is used as a "cache" buffer which is adapted to NVMe transactions while having very high hit-rate using the current approach. Other advantages include the device being able to advertise the support of a very large size CMB and PMR since the CMB/PMR is incorporated in DRAM and not in SRAM which is especially important when having several or even many CMBs/PMRs such as in a virtualization environment. Additionally, there is no need for a huge application specific integrated circuit (ASIC) area in order to support a huge CMB/PMR size.

In one embodiment, a data storage device comprises: a memory device; and a controller coupled to the memory device, wherein the controller has a controller memory buffer (CMB) and the controller is configured to: receive a read command from a host device; retrieve data from the memory device, wherein the data is associated with the read command; write the retrieved data to a CMB cache of the CMB; inform the host device the read command is completed; and delete the retrieved data from CMB cache after the host device has read the retrieved data from the CMB cache. The CMB cache is static random access memory (SRAM). The controller is further configured to flush the retrieved data from SRAM to dynamic random access memory (DRAM) after a predetermined period of time has passed prior to the host device reading the retrieved data. The CMB includes the CMB cache and dynamic random access memory (DRAM). The controller is configured to maintain a CMB address mapping table. The CMB address mapping table contains entries indicating whether retrieved data associated with read commands is located in static random access memory (SRAM) or dynamic random access memory (DRAM). The controller is configured to delete physical region page (PRP) pointers or scatter gather list (SGL) pointers from the CMB address mapping table after the host device has read the retrieved data from the CMB cache. The controller is configured to write additional data associated with the read command in the CMB cache after deleting the retrieved data. The controller is configured to detect when the host device has read the retrieved data from CMB cache.

In another embodiment, a data storage device comprises: a memory device; and a controller coupled to the memory device, wherein the controller is configured to: receive a read command from a host device; read data from the memory device, wherein the read data corresponds to the read command; place the read data in controller memory buffer (CMB) cache; determine that the host device has read the read data from CMB cache; find relevant physical region page (PRP) pointer or scatter gather list (SGL) pointer in mapping table; delete the read data from the CMB cache; and delete the PRP pointer or SGL pointer from the mapping table. The controller includes a CMB manager and wherein the CMB manager includes the CMB cache and PRP/SGL buffers. The controller is configured to determine whether the CMB cache is static random access memory (SRAM) or dynamic random access memory (DRAM), and wherein the controller includes both SRAM and DRAM. The controller is configured to determine whether there is additional data to retrieve for the read command. The controller is configured to update a completion queue prior to the finding. The controller is configured to detect that the host device reads the data from CMB cache in order. The controller is configured to detect that the host device reads the data from CMB cache out of order. The controller is configured to adjust future read command processing to retrieve data from the memory device out of order.

In another embodiment, a data storage device comprises: means to store data; and a controller coupled to the means to store data, wherein the controller is configured to: retrieve data from the means to store data; write the retrieved data in static random access memory (SRAM); detect that the retrieved data has been received by a host device; and delete the retrieved data from SRAM based upon the detecting. Data for write commands from the host device pass through dynamic random access memory (DRAM) and the retrieved data passes through the SRAM, and wherein the SRAM and DRAM are distinct from the means to store data. The controller is configured to update a controller memory buffer (CMB) mapping table with location of the retrieved data in SRAM.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller has a controller memory buffer (CMB) and the controller is configured to:
receive a read command from a host device;
retrieve data from the memory device, wherein the data is associated with the read command;
write the retrieved data to a CMB cache of the CMB, wherein the CMB cache is static random access memory (SRAM);
inform the host device the read command is completed;
delete the retrieved data from CMB cache after the host device has read the retrieved data from the CMB cache; and
flush the retrieved data from SRAM to dynamic random access memory (DRAM) after a predetermined period of time has passed prior to the host device reading the retrieved data.

2. The data storage device of claim 1, wherein the CMB includes the CMB cache and DRAM.

3. The data storage device of claim 1, wherein the controller is configured to maintain a CMB address mapping table.

4. The data storage device of claim 3, wherein the CMB address mapping table contains entries indicating whether retrieved data associated with read commands is located in SRAM or DRAM.

5. The data storage device of claim 4, wherein the controller is configured to delete physical region page (PRP) pointers or scatter gather list (SGL) pointers from the CMB address mapping table after the host device has read the retrieved data from the CMB cache.

6. The data storage device of claim 1, wherein the controller is configured to write additional data associated with the read command in the CMB cache after deleting the retrieved data.

7. The data storage device of claim 1, wherein the controller is configured to detect when the host device has read the retrieved data from CMB cache.

* * * * *